United States Patent
Schell et al.

(10) Patent No.: US 6,231,097 B1
(45) Date of Patent: May 15, 2001

(54) ROTATABLE SPARE WHEEL CARRIER

(75) Inventors: Brian Cameron Schell, Washington; Peter W. Heath, Clinton Township; Giles David Bryer, Ann Arbor; Sajid Syed, Warren; Marcel R. Cannon, Romeo, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/557,389

(22) Filed: Apr. 24, 2000

(51) Int. Cl.[7] .................................................. B62D 43/06
(52) U.S. Cl. .......................................... 296/37.2; 296/189
(58) Field of Search .............................. 296/37.2, 37.3, 296/189, 203.04, 203.02

(56) References Cited

U.S. PATENT DOCUMENTS 3,595,335 * 7/1971 Wessells, III et al. .............. 296/189
3,642,296 * 2/1972 Froumajou ...................... 296/37.2 X

FOREIGN PATENT DOCUMENTS 5-178240 * 7/1993 (JP) ..................................... 296/37.2

* cited by examiner

Primary Examiner—D. Glenn Dayoan
Assistant Examiner—Patricia Engle
(74) Attorney, Agent, or Firm—Jeffrey A. Sedlar

(57) ABSTRACT

A rotatable spare wheel carrier is provided for a rear compartment of a vehicle. The rotatable spare wheel carrier includes a base portion adapted to engage a spare wheel and be spaced above a base wall of a recess in a rear compartment of a vehicle. The rotatable spare wheel carrier also includes a leg portion extending downwardly and longitudinally from the base portion and a foot portion extending longitudinally from the leg portion and adapted to be secured to the base wall. The rotatable spare wheel carrier further includes a living hinge between the base portion and the leg portion to allow the base portion to rotate relative to the leg portion upon an impact on a rear of the vehicle.

20 Claims, 3 Drawing Sheets

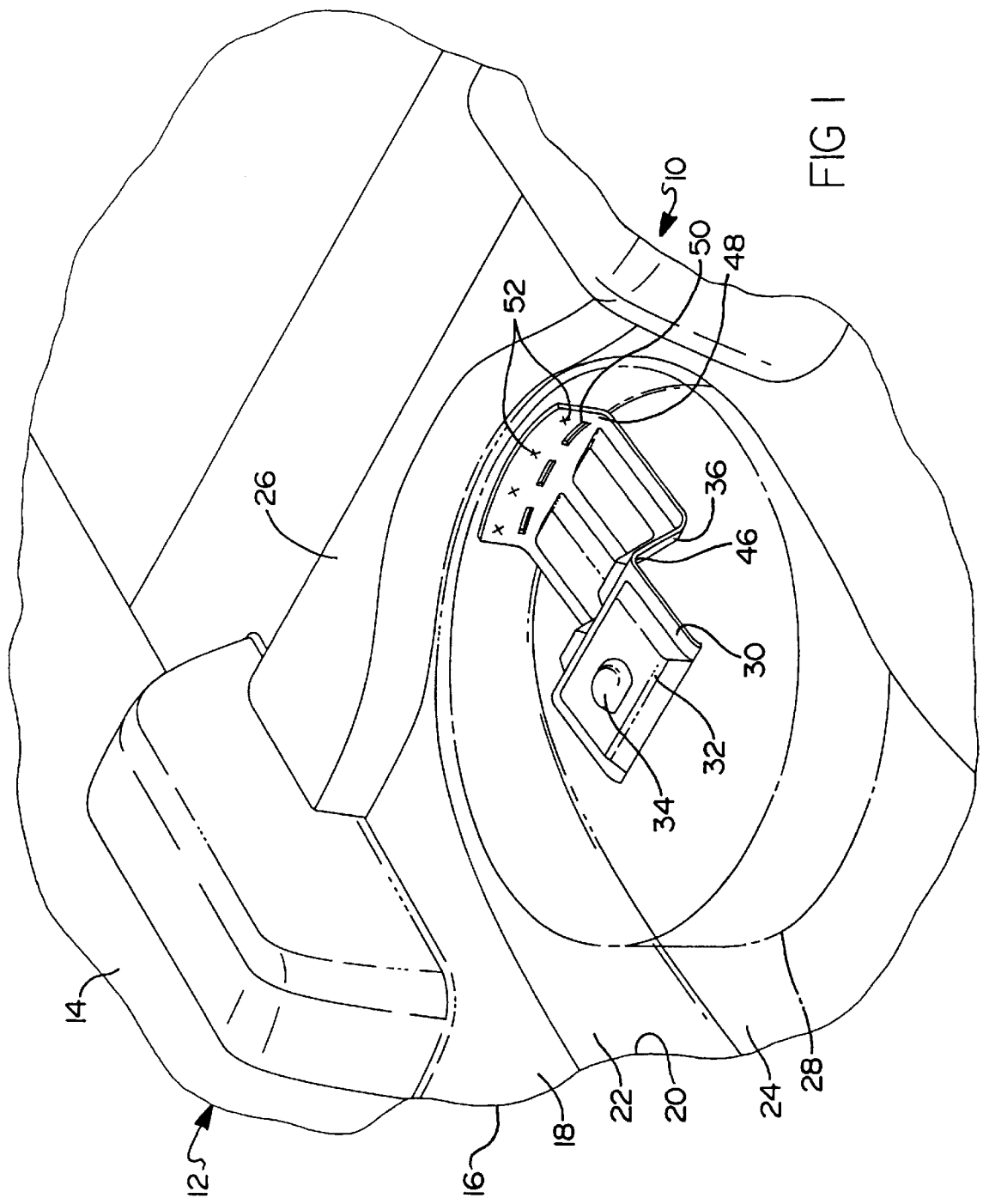

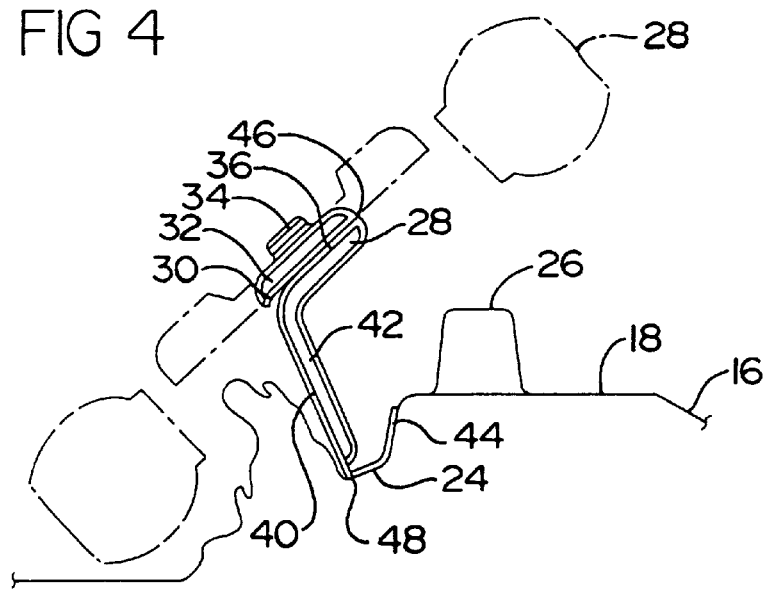
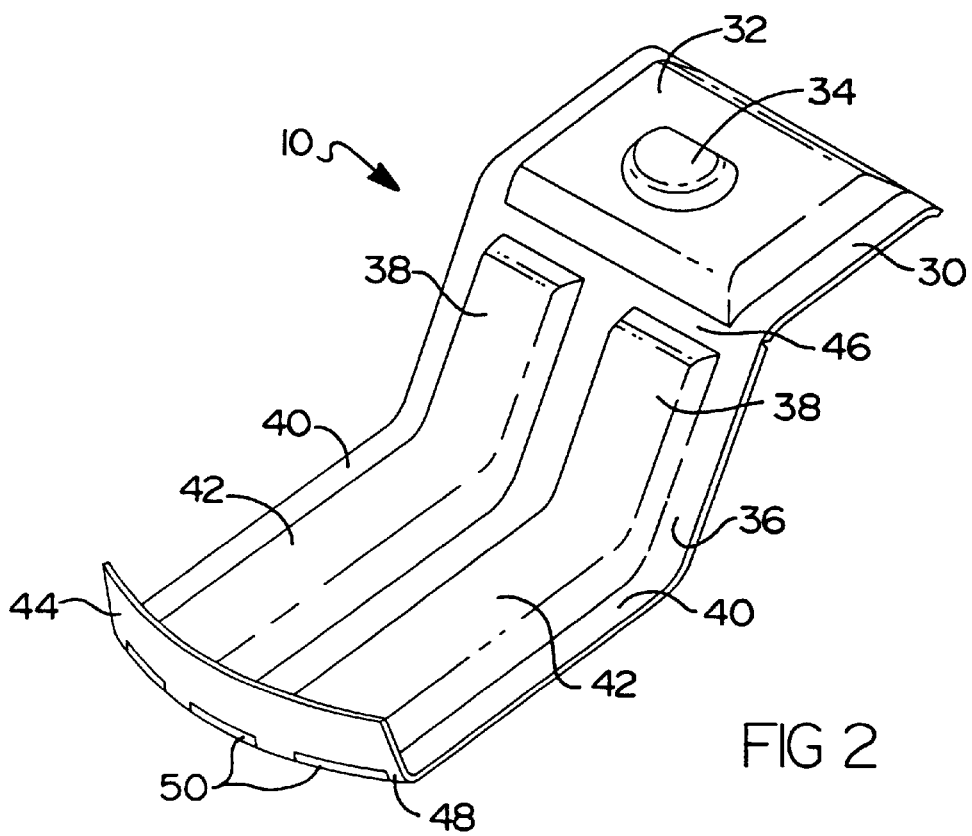

FIG 5
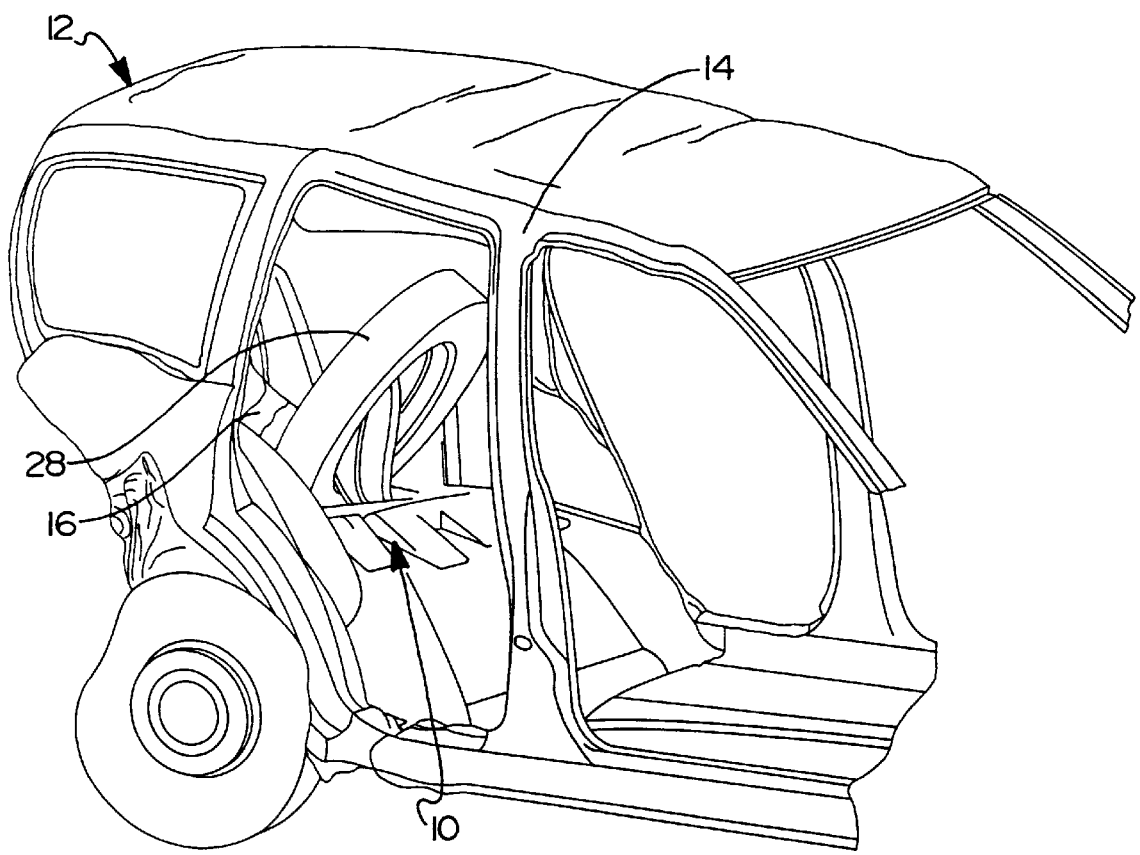
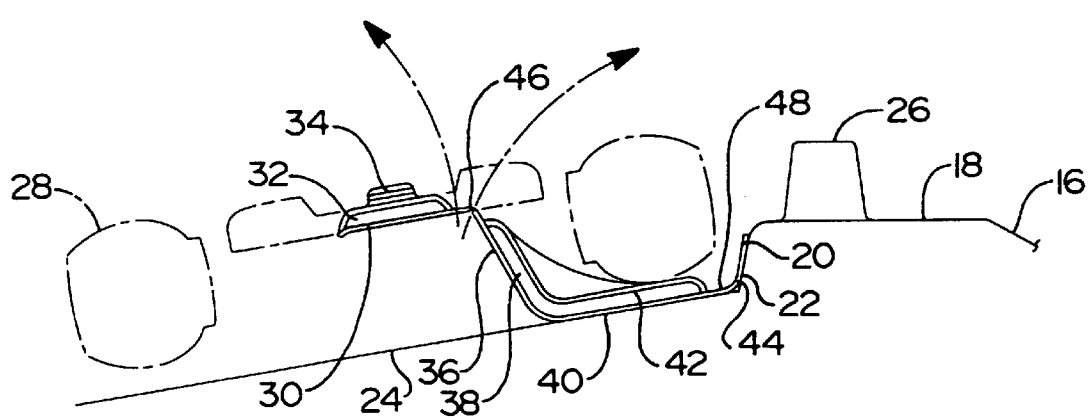
FIG 3

ROTATABLE SPARE WHEEL CARRIER

TECHNICAL FIELD

The present invention relates generally to spare wheels for vehicles and, more particularly, to a rotatable spare wheel carrier for a vehicle.

BACKGROUND OF THE INVENTION

It is known to provide a spare wheel for a vehicle in the event of a flat or blowout of one of four wheels of the vehicle. The spare wheel may be carried interior or exterior to the vehicle. Typically, the vehicle has a rear compartment, which contains the spare wheel such that it is packaged between rails of the rear compartment on either a dry or wet side of sheetmetal for the rear compartment. For passenger vehicle applications, the spare wheel is mounted on a spare wheel carrier on the dry side and is pre-tilted to help enable the spare wheel to rotate during a rear impact on the vehicle. During a rear impact, the rails of the rear compartment and the spare wheel carrier move dependent upon one another and hence the rails absorb energy through bending.

Although the above has worked, it is desirable to provide a spare wheel carrier that is rotated to allow the rails to dissipate energy during axial crush. It is also desirable to provide a spare wheel carrier that moves independently of rails for a rear compartment of a vehicle. Therefore, there is a need in the art to provide a rotatable spare wheel carrier for a vehicle.

SUMMARY OF THE INVENTION

It is, therefore, one object of the present invention to provide a rotatable spare wheel carrier for a vehicle.

It is another object to provide a rotatable spare wheel carrier for a rear compartment of a vehicle.

It is yet another object of the present invention to provide a rotatable spare wheel carrier for a rear compartment of a vehicle that moves independently of rails for the rear compartment.

To achieve the foregoing objects, the present invention is a rotatable spare wheel carrier for a rear compartment of a vehicle including a base portion adapted to engage a spare wheel and be spaced above a base wall of a recess in a rear compartment of a vehicle. The rotatable spare wheel carrier also includes a leg portion extending downwardly and longitudinally from the base portion and a foot portion extending longitudinally from the leg portion and adapted to be secured to the base wall. The rotatable spare wheel carrier further includes a living hinge between the base portion and the leg portion to allow the base portion to rotate relative to the leg portion upon an impact on a rear of the vehicle.

One advantage of the present invention is that a rotatable spare wheel carrier is provided for a rear compartment of a vehicle. Another advantage of the present invention is that the rotatable spare wheel carrier provides more styling and packaging flexibility for a given mass and cost.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 1 is a perspective view of a rotatable spare wheel carrier, according to the present invention, illustrated in operational relationship with a spare wheel and a rear compartment of a vehicle.

FIG. 2 is a perspective view of the rotatable spare wheel carrier of FIG. 1 illustrating the spare wheel removed.

FIG. 3 is a sectional side view of the rotatable spare wheel carrier and rear compartment of FIG. 1 before an impact.

FIG. 4 is a sectional side view of the rotatable spare wheel carrier and rear compartment of FIG. 1 after an impact.

FIG. 5 is a perspective view of the rotatable spare wheel carrier and rear compartment of FIG. 1 after an impact.

DESCRIPTION OF THE PREFERRED EMBODIMENT

Referring to the drawings and in particular FIGS. 1, 2 and 5, one embodiment of a rotatable spare wheel carrier 10, according to the present invention, is shown for a vehicle such as a motor vehicle, generally indicated at 12. Such motor vehicles 12 typically include a vehicle body 14 (partially shown) forming a rear compartment 16. The rear compartment 16 has a floorpan 18 having a recess 20 therein. The recess 20 is formed by a side wall 22 extending downwardly from the floorpan 18 and a base wall 24 extending from the side wall 22 and generally perpendicular thereto. The rear compartment 16 may have a raised reinforcement member 26 extending outwardly from the floorpan 18 at a forward end of the recess 20 to provide support for the foot portion 40, to be described, of the rotatable spare wheel carrier 10. The rotatable spare wheel carrier 10 is disposed in the recess 20 for carrying a spare wheel 28. It should be appreciated that the raised reinforcement member 26 may extend outwardly above or below the floorpan 18. It should also be appreciated that, except for the rotatable spare wheel carrier 10, the vehicle 12 is conventional and known in the art.

The rotatable spare wheel carrier 10 includes a base portion 30 space above the base wall 24 of the recess 20. The base portion 30 is generally rectangular in shape. The base portion 30 may include a raised portion 32 extending upwardly and outwardly therefrom. The raised portion 32 is generally rectangular in shape. The base portion 30 has a projection 34 extending upwardly and outwardly therefrom. The projection 34 is generally circular in shape to be disposed in a corresponding recess (not shown) in the spare wheel 28.

The rotatable spare wheel carrier 10 includes a leg portion 36 extending downwardly and longitudinally from a forward end of the base portion 30. The leg portion 36 is generally rectangular in shape. The leg portion 36 includes at least one, preferably a pair of raised rib portions 38 extending outwardly and longitudinally therealong. The rib portions 38 are spaced laterally and are generally rectangular in shape.

The rotatable spare wheel carrier 10 also includes a foot portion 40 extending longitudinally from a lower end of the leg portion 36. The foot portion 40 is generally rectangular in shape. The foot portion 40 includes at least one, preferably a pair of raised rib portions 42 extending outwardly and upwardly and longitudinally therealong. The rib portions 42 are spaced laterally and are generally rectangular in shape. The foot portion 40 includes a flange 44 extending upwardly and generally perpendicular thereto. The flange 44 extends laterally and is arcuate in shape complementary to the side wall 22 of the recess 20.

The rotatable spare wheel carrier 10 includes a first living hinge 46 disposed between the base portion 30 and the leg portion 36. The living hinge 46 extends laterally thereacross and allows the base portion 30 to rotate relative to the leg portion 36. The rotatable spare wheel carrier 10 also includes another or second living hinge 48 disposed between the foot portion 40 and the flange 44. The living hinge 48 extends laterally thereacross and may include at least one, preferably a plurality of slots 50 extending laterally and therethrough. The second living hinge 48 allows the foot portion 40 to rotate relative to the flange 44. The rotatable spare wheel carrier 10 is made of a metal material such as steel. The rotatable spare wheel carrier 10 is formed as a monolithic structure being integral, unitary and one-piece.

Referring to FIGS. 3 and 4, the rotatable spare wheel carrier 10 is disposed in the recess 20 in the rear compartment 16. In this position, the flange 44 of the foot portion 40 is secured to the side wall 22 of the recess 20 by suitable means such as welding as indicated at 52. The spare wheel 28 is mounted to the base portion 30 with the projection 34 extending through an aperture in the spare wheel 28. Suitable means such as a bracket and fastener (not shown) are removably connected to the projection 34 of the base portion 30 to secure the spare tire 28 to the rotatable spare wheel carrier 10. During an impact on the rear of the vehicle 12, the rear compartment 16 is crushed axially. As the rear compartment 16 crushes, a load is applied to the spare wheel 28 and rotatable spare wheel carrier 10. As a result, the spare wheel 28 and base portion 30 rotate relative to the leg portion 36 via the first living hinge 46. The spare wheel 28 is forced to rotate upwardly relative to the rear compartment 16, which continues to crush axially. The foot portion 40 rotates relative to the flange 44 via the second living hinge 48 to allow the spare wheel 28 to rotate counterclockwise as viewed from a right side of the vehicle 12 as illustrated in FIGS. 4 and 5. With the rotatable spare wheel carrier 10 rotated out of the way, the rear rails (not shown) are allowed to axially crush and dissipate energy. It should be appreciated that the rotatable spare wheel carrier 10 acts as a simple pinned/translational linkage mechanism.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A rotatable spare wheel carrier for a rear compartment of a vehicle comprising:

a base portion adapted to engage a spare wheel and be spaced above a base wall of a recess in a rear compartment of a vehicle;

a leg portion extending downwardly and longitudinally from said base portion;

a foot portion extending longitudinally from said leg portion and adapted to be secured to the base wall; and a living hinge between said base portion and said leg portion to allow said base portion to rotate relative to said leg portion upon an impact on a rear of the vehicle.

2. A rotatable spare wheel carrier as set forth in claim 1 wherein said base portion has a raised portion extending outwardly therefrom.

3. A rotatable spare wheel carrier as set forth in claim 1 wherein said base portion includes a projection extending outwardly therefrom and adapted to engage the spare wheel.

4. A rotatable spare wheel carrier as set forth in claim 1 wherein said leg portion includes at least one rib portion extending outwardly therefrom.

5. A rotatable spare wheel carrier as set forth in claim 1 wherein said foot portion includes a flange extending perpendicularly thereto and adapted to be secured to a side wall of the recess in the rear compartment.

6. A rotatable spare wheel carrier as set forth in claim 1 wherein said foot portion includes at least one rib portion extending outwardly therefrom.

7. A rotatable spare wheel carrier as set forth in claim 5 including a second living hinge between said foot portion and said flange to allow said foot portion to rotate upwardly relative to said flange.

8. A rotatable spare wheel carrier as set forth in claim 7 wherein said second living hinge includes at least one slot extending therethrough between said foot portion and said flange.

9. A rotatable spare wheel carrier as set forth in claim 1 wherein said base portion, said leg portion and said foot portion are integral, unitary and one-piece.

10. A rotatable spare wheel carrier as set forth in claim 1 wherein said base portion, said leg portion and said foot portion are made of a metal material.

11. A rotatable spare wheel carrier for a rear compartment of a vehicle comprising:

a base portion adapted to engage a spare wheel and be spaced above a base wall of a recess in a rear compartment of a vehicle;

a leg portion extending downwardly and longitudinally from a forward end of said base portion;

a foot portion extending longitudinally from said leg portion and having a flange adapted to be secured to a side wall of the recess; and a first living hinge extending between said base portion and said leg portion to allow said base portion rotate relative to said leg portion and a second living hinge extending between said foot portion and said flange to allow said foot portion to rotate relative to said flange and upwardly relative to the rear compartment upon an impact on a rear of the vehicle.

12. A rotatable spare wheel carrier as set forth in claim 11 wherein said base portion has a raised portion extending outwardly therefrom.

13. A rotatable spare wheel carrier as set forth in claim 11 wherein said base portion includes a projection extending outwardly therefrom and adapted to engage the spare wheel.

14. A rotatable spare wheel carrier as set forth in claim 11 wherein said leg portion includes at least one rib portion extending outwardly therefrom.

15. A rotatable spare wheel carrier as set forth in claim 11 wherein said flange extends perpendicularly to said foot portion and is arcuate in shape to be secured to the side wall.

16. A rotatable spare wheel carrier as set forth in claim 11 wherein said foot portion includes at least one rib portion extending outwardly therefrom.

17. A rotatable spare wheel carrier as set forth in claim 11 including at least one slot in said second living hinge between said foot portion and said flange.

18. A rotatable spare wheel carrier as set forth in claim 11 wherein said base portion, said leg portion, and said foot portion are made of a metal material.

19. A rotatable spare wheel carrier as set forth in claim 11 wherein said base portion, said leg portion and said foot portion are integral, unitary and one-piece.

20. A rear compartment of a vehicle comprising:

a floorpan with a recess formed by a side wall extending downwardly and a side wall extending longitudinally from said base wall to allow a spare wheel to be disposed in said recess;

a rotatable spare wheel carrier disposed in said recess and adapted to engage the spare wheel; and said rotatable spare wheel carrier including a base portion adapted to engage the spare wheel and be spaced above said base wall of said recess, a leg portion extending downwardly and longitudinally from said base portion, a foot portion extending longitudinally from said leg portion, and a flange extending upwardly from said foot portion and secured to said side wall, and a first living hinge between said base portion and said leg portion to allow said base portion to rotate relative to said leg portion and a second living hinge between said foot portion and said flange to allow said foot portion to rotate upwardly relative to said flange upon an impact on a rear of the vehicle.

* * * * *